United States Patent [19]

Matsumura et al.

[11] Patent Number: 4,842,797

[45] Date of Patent: Jun. 27, 1989

[54] PROCESS FOR PRODUCING SHAPED POLYAMIDE ARTICLES

[75] Inventors: Shunichi Matsumura; Hiroo Inata, both of Iwakuni, Japan

[73] Assignee: Teijin Limited, Osaka, Japan

[21] Appl. No.: 86,585

[22] Filed: Aug. 18, 1987

[30] Foreign Application Priority Data

Aug. 21, 1986 [JP] Japan ............................ 61-194060
Nov. 17, 1986 [JP] Japan ............................ 61-271943

[51] Int. Cl.$^4$ ........................ D01F 1/02; D01F 6/60; D01F 11/04
[52] U.S. Cl. .............................. 264/203; 264/210.4; 264/210.6; 264/210.8; 264/211; 264/211.16; 264/211.19
[58] Field of Search .............. 264/203, 211.16, 211.19, 264/DIG. 61, 211, 171, 210.6, 210.8, 210.4

[56] References Cited

U.S. PATENT DOCUMENTS

| | | | |
|---|---|---|---|
| 3,227,793 | 1/1966 | Cipriani ............................ | 264/203 |
| 3,288,738 | 11/1966 | Rosenthal et al. ................ | 260/29.2 |
| 3,322,824 | 5/1967 | Roberts ............................. | 260/30.8 |
| 3,574,811 | 4/1971 | Jamison ............................ | 264/203 |
| 3,941,755 | 3/1976 | Chapman et al. ................. | 524/607 |
| 4,337,331 | 6/1982 | Hancock ........................ | 264/211.16 |
| 4,416,839 | 11/1983 | Inata et al. ......................... | 264/49 |
| 4,581,399 | 4/1986 | Yoon ................................ | 264/211 |
| 4,612,148 | 9/1986 | Matooka et al. ................. | 264/211 |

FOREIGN PATENT DOCUMENTS 45-17551 1/1970 Japan .
56-165011 12/1981 Japan .
60-188019 9/1985 Japan .

*Primary Examiner*—Hubert Lorin
*Attorney, Agent, or Firm*—Wenderoth, Lind & Ponack

[57] ABSTRACT

A process for producing a shaped article of polyamide which comprises (1) melt-shaping an intimate mixture of 100 parts by weight of a polyamide having hexamethylene terephthalamide as main recurring units and 20 to 500 parts by weight of an aromatic hydroxy compound, and then (2) removing the aromatic hydroxy compound from the resulting shaped article by extraction.

19 Claims, No Drawings

PROCESS FOR PRODUCING SHAPED POLYAMIDE ARTICLES

This invention relates to a process for producing a shaped article of polyamide, and more specifically to a process for producing a shaped article of a polyamide containing hexamethylene terephthalamide as main recurring units and having a high melting point and very high heat resistance by a melt-shaping technique.

Polyhexamethylene terephthalamide (to be abbreviated as nylon-6T) can be produced from inexpensive raw materials, and is known as a polyamide having a high melting point (370° C.) and excellent heat resistance. However, because of its high melting point, nylon-6T is extremely difficult to fiberize by a melt-spinning method which is used for spinning polyhexamethylene adipamide (nylon-66), polycaprolactam (nylon-6), etc. (see Textile Research Journal, November 1965, pages 999–1008). Accordingly, prior studies on the fiberization of nylon-6T were directed mainly to wet-spinning using strong acids such as sulfuric acid as a solvent (see U.S. Pat. Nos. 3227793, 3574811, 3288738 and 3322824, and Textile Research Journal, November 1965, pages 999– 1008).

Japanese Laid-Open Patent Publication No. 165,011/1981 discloses a process for producing fibers of poly(polymethylene terephthalamide) which comprises preparing a uniform single-phase melt of poly(polymethylene terephthalamide) and water, extruding the melt from a spinneret to form filaments and drawing the filaments.

Japanese Patent Publication No. 17551/1970 discloses a nylon polymer composition suitable for production of tough tire cords, which is prepared by adding about 1.5 to about 5% by weight of a sulfonamide of the following formula

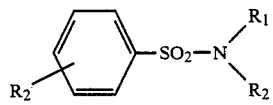

wherein $R_1$ represents hydrogen, alkyl or cycloalkyl, and $R_2$ represents hydrogen or alkyl, to a random copolymer composed of hexamethylene adipamide and hexamethylene terephthalamide containing about 15 to about 55% by weight of hexamethylene terephthalamide recurring units having a much lower melting point than polyhexamethylene terephthalamide, thereby to improve the spinnability of the copolymer further.

U.S. Pat. No. 3,941,755 discloses a fiber-forming copolymer consisting essentially of recurring units of the formulas:

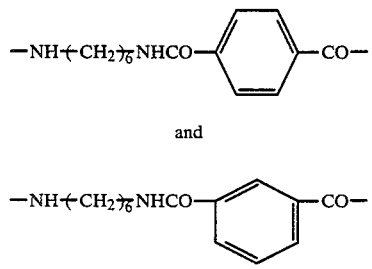

wherein the mole ratio of units A to B is between about 60:40 and about 80:20 and wherein said copolymer in fiber form has a boiling water shrinkage between 10 and 30%. This patent discloses a method of producing this copolymer, which comprises performing melt-polymerization in the presence of a mixture of N-ethyl-o-toluene sulfonamide and N-ethyl-p-toluene sulfonamide as a plasticizer.

Japanese Laid-Open Patent Publication No. 188,019/1985 discloses a process for producing polyamide monofilaments having excellent tenacity, pliability, abrasion resistance and algal resistance and being suitable for fishing applications, which comprises melt-spinning a composition comprising polycaprolactam or a copolyamide comprising at least 50% by weight of caprolactam, 0.5 to 5% by weight of organopolysiloxane, and 1 to 10% by weight of a sulfonamide-type plasticizer.

The processes disclosed in Japanese Patent Publication No. 17,551/1970, U.S. Pat. No. 3,941,755, and Japanese Laid-Open Patent Publication No. 188,019/1985 are designed to improve further the spinnability of a copolyamide having a large copolymerization ratio, and possessing an inherently much low melting point and accordingly good melt-spinnability. According to these methods, a small proportion of a sulfonamide is added to the copolyamide to plasticize the copolyamide. After spinning, no operation is carried out of removing the sulfonamide.

It is an object of this invention to provide a process for producing a shaped article from a high-melting polyamide by a melt-shaping technique.

Another object of this invention is to provide a process for melt-shaping a melt-shapable mixture of a polyamide having a high melting point and containing hexamethylene terephthalamide as main recurring units and an aromatic hydroxy compound.

Still another object of this invention is to provide a process for producing a shaped article of polyamide, in which the aromatic hydroxy compound is removed from the melt-shaped article.

Other objects of the invention along with its advantages will become apparent from the following description.

According to this invention, these objects and advantages are achieved by a process for producing a shaped article of polyamide which comprises (1) melt-shaping an intimate mixture of 100 parts by weight of a polyamide having hexamethylene terephthalamide as main recurring units and 20 to 500 parts by weight of an aromatic hydroxy compound, and then (2) removing the aromatic hydroxy compound from the resulting shaped article by extraction.

The polyamide used in this invention is a polyamide containing hexamethylene terephthalamide as main recurring units. Preferably, it may, for example, be a homopolymer of hexamethylene terephthalamide, and a copolyamide comprising at least 70 mole%, based on the entire recurring units, of hexamethylene terephthalamide recurring units. In the copolyamide, the proportion of the hexamethylene terephthalamide recurring units is preferably at least 80 mole%; especially preferably at least 90 mole%, based on the entire recurring units.

Other recurring units in the copolyamide are derived, for example, from at least one of dicarboxylic acids such as isophthalic acid, 4,4'-diphenyldicarboxylic acid, 2,6- naphthalenedicarboxylic acid, 4,4'-diphenylether dicarboxylic acid, 3,4'-diphenylether dicarboxylic acid, adipic acid and sebacic acid, diamines such as ethylenediamine, tetramethylenediamine, octamethylenediamine, decamethylenediamine, dodecamethylenediamine, 3,4'-diaminodiphenyl ether and 4,4'-diaminodiphenyl ether, and aminocaproic acids such as epsilon-aminocaproic acid (epsilon-caprolactam).

Preferred as the polyamide to be used in this invention are hexamethylene terephthalamide homopolymer or copolymers having melting points in the range of about 320° C. to about 370° C.

The polyamide used in this invention has an inherent viscosity, $\xi_{inh}$, determined at 30° C. in concentrated sulfuric acid in a concentration of 0.5 g/dl, of preferably at least 0.4, more preferably 1 to 3.

The high-melting polyamide to which the present invention is directed is used in combination with an aromatic hydroxy compound. The aromatic hydroxy compound, as an intimate mixture with the polyamide, enables the high-melting polyamide to be melt-shaped.

The aromatic hydroxy compound is an aromatic compound in which the hydroxyl group is directly bonded to the aromatic ring. The aromatic hydroxy compound may contain one or more aromatic rings per molecule, and one or more hydroxyl groups.

Preferred aromatic hydroxy compounds may, for example, be those which have a phenolic hydroxyl group and have at least one electron attracting group selected from the group consisting of halogen atoms, a nitro group, halogenoalkyl groups, a carbonyl group and a sulfone group on the phenyl ring to which the hydroxyl group is bonded. Specific examples of the aromatic hydroxy compound include phenol, chlorophenol, dichlorophenol, trichlorophenol, fluorophenol, difluorophenol, nitrophenol, bis(4-hydroxyphenyl)sulfone, bis(3-chloro-4-hydroxyphenyl)sulfone, bis(3,5-dichloro-4-hydroxyphenyl)sulfone, bis(3-methyl-4-hydroxyphenyl)sulfone, 2,2-bis(4-hydroxyphenyl)hexafluoropropane, 4,4'-dihydroxybenzophenone, 2,2-bis(3-chloro-4-hydroxyphenyl)propane and 2,2-bis(3,5-dichloro-4-hydroxyphenyl)propane. They may be used either singly or in combination.

Preferred among the above aromatic hydroxy compounds are those which satisfy the following relation:

M/n≦200 wherein M is the molecular weight of the aromatic hydroxy compound, and n is the number of hydroxyl groups in the aromatic hydroxy compound.

Preferably, the aromatic hydroxy compound has a pKa smaller than the pKa (10) of phenol. In regard to an aromatic polyhydroxyl compound having two or more hydroxyl groups, its pKa value is that of a hydroxyl group which dissociates in the first place.

The aromatic hydroxy compound is mixed with the polyamide to give an intimate mixture.

Preferably, the aromatic hydroxy compound gives a melting point different from the melting points of the polyamide and the aromatic hydroxy compound to the intimate mixture of it with the polyamide. More preferably, it has a boiling point higher than the melt-shaping temperature of the intimate mixture at the time of melt-shaping.

An especially suitably used aromatic hydroxy compound in this invention is bis(4-hydroxyphenyl)-sulfone.

In the process of this invention, the first step is carried out by melt-shaping the intimate mixture of the polyamide and the aromatic hydroxy compound. This mixture is composed of 100 parts of the polyamide and 20 to 500 parts by weight of the aromatic hydroxy compound. In these mixing proportions, the aromatic hydroxy compound melts uniformly together with the polyamides and by its plasticizing action, reduces the melting point of the resulting intimate mixture. If the proportion of the aromatic hydroxy compound is less than 20 parts by weight, its plasticizing action to decrease the melting point of the intimate mixture is insufficient. If, on the other hand, it exceeds 500 parts by weight, the melt viscosity of the resulting intimate mixture decreases markedly and cannot be used in ordinary melt shaping. The amount of the aromatic hydroxy compound is preferably 30 to 400 parts by weight, especially preferably 40 to 300 parts by weight, per 100 parts by weight of the polyamide.

The intimate mixture used in the first step of the process of this invention preferably has a melting point in the range of 220° to 330° C. which differs from the melting points of the polyamide and the aromatic hydroxy compound in it. This shows that the mixture used in the first step is an intimate mixture of the polyamide and the aromatic hydroxy compound.

The intimate mixture used in the first step of the process of this invention may be prepared by a method of melt-mixing the polyamide and the aromatic hydroxy compound, or by performing polyamide-forming polycondensation reaction in the presence of the aromatic hydroxy compound.

According to the latter method, the intimate mixture may be produced by reacting under heat substantially equimolar proportions of a difunctional carboxylic acid consisting mainly of terephthalic acid or its amide-forming derivative and a diamine composed mainly of hexamethylenediamine, optionally in salt form, in the presence of the aromatic hydroxy compound to produce a polyamide comprising hexamethylene terephthalamide as main recurring units. In this reaction, the aromatic hydroxy compound is not substantially taken by reaction into the polymer chains of the resulting polyamide, nor induces undesirable side-reactions which hamper the polycondensation reaction.

The difunctional carboxylic acid used in the above reaction is most preferably terephthalic acid alone, but may contain a small proportion of another dicarboxylic acid. Preferred examples of the other difunctional carboxylic acid may be compounds which are exemplified hereinabove as the third component (comonomer component) of the polyamide.

The amide-forming derivative of the difunctional carboxylic acid may, for example, be an ester, an acid halide, etc. of the difunctional carboxylic acid. Examples of the ester are methyl, ethyl and phenyl esters. An acid chloride is an example of the acid halide. Esters are preferred as the amide-forming derivative.

The diamine is most preferably hexamethylenediamine alone, but may contain a small proportion of another diamine. Examples of the other diamine may preferably be those compounds exemplified hereinabove as the third component (comonomer component) of the polyamide.

In the above reaction, the amounts of the acid component and the amine component are preferably equimolar. Either one of the components may be in a slight excess. If, however, one of them is in large excess, a polyamide of a high degree of polymerization cannot be obtained. To adjust the amounts of the acid component and the diamine component to equimolar proportions, it is preferred to use salts of the difunctional carboxylic acid and diamine.

Desirably, the reaction of forming the polyamide is carried out by heating the reaction system in the presence of 20 to 500 parts by weight, per 100 parts by weight of the resulting polyamide, of the aromatic hydroxy compound. At this time, the aromatic hydroxy compound may be added during the reaction. The reaction temperature may be above a temperature at which the polycondensation reaction can proceed sufficiently and above a temperature at which the resulting composition can be maintained in the molten state. This temperature differs according to the composition of the polymer, and the type and amount of the aromatic hydroxy compound used. The temperature tends to increase as the degree of polymerization increases. Roughly, the reaction temperature is about 200° to 330° C. The polymerization reaction is slow at temperatures lower than 200° C. If this temperature is higher than 330° C., the resulting polyamide composition is undesirably liable to undergo coloration or thermal decomposition.

The reaction system may be under atmospheric, reduced or elevated pressures if the aromatic hydroxy compound used and the monomer formed are not evaporated out of the reaction system. For example, if the boiling point under atmospheric pressure of the aromatic hydroxy compound is below the reaction temparature, the reaction system is preferably maintained under elevated pressure. It is preferred however to distill off rapidly byproducts of the polycondensation such as water (when the acid component is a carboxylic acid) and an alcohol (when the acid component is an ester). The reaction system is preferably in an inert gaseous atmosphere such as nitrogen or argon.

The reaction time may be one sufficient to cause the polycondensation to proceed fully. The reaction time varies depending upon the starting materials used, the type and amount of the aromatic hydroxy compound and the reaction temperature. Preferably, it is 5 minutes to 10 hours, more preferably 10 minutes to 5 hours.

In some cases, the polycondensation reaction may be performed in the solid phase at a temperature below the melting point of the intimate mixture of the polyamide and the aromatic hydroxy compound. The reaction temperature is preferably 200° C. to (the melting point—5) °C., especially preferably 210° C. to (the melting point—10) °C., The reaction system is preferably under atmospheric or reduced pressure in an inert gas current such as nitrogen or argon. The reaction time is preferably 1 to 50 hours, especially preferably about 2 to 40 hours.

The inherent viscosity, $\xi_{inh}$, of the polyamide in the resulting intimate mixture can be determined by measuring the inherent viscosity of the polyamide alone obtained by extracting the mixture with a solvent which dissolves the aromatic hydroxy compound contained in the mixture but does not dissolve nor react with the polyamide.

Examples of such an extracting solvent include ketones such as acetone and methyl ethyl ketone; lower alcohols such as methanol, ethanol and isopropanol; ethers such as tetrahydrofuran and dioxane; esters such as ethyl acetate; aromatic hydrocarbons such as toluene and xylene; and halogenated hydrocarbons such as methylene chloride, chloroform and trichloroethylene.

Melt-shaping of the intimate mixture is preferably carried out at a temperature from 2° C. higher than the melting point of the intimate mixture to 30° C. higher than the melting point, preferably at a temperature from 5° C. higher than the melting point to 20° C. higher than the melting point.

Since according to the present invention, the melting point of the intimate mixture can be greatly lowered from the melting point of the polyamide, the polyamide can be molten at a relatively low temperature at which the polyamide does not substantially decompose thermally. Hence, the polyamide can be subjected to ordinary melt-shaping. For example, a polyamide composition composed of 100 parts by weight of polyhexamethylene terephthalamide and 122 parts by weight of bis(4-hydroxyphenyl)sulfone has a melting point of 300° C. and thus can be molten at a temperature 70° C. lower than the melting point of polyhexamethylene terephthalamide which is 370° C. Hence, this composition can be submitted to ordinary melt-shaping, for example melt-spinning.

As required, the intimate mixture in accordance with this invention may further comprise various stabilizers such as an antioxidant, a coloration inhibitor and an ultraviolet absorber, a pigment, a lubricant, a nucleating agent, a coloring agent, and a fire retardant.

Melt-shaping can give shaped articles of various forms. The melt-shaped articles may, for example, be films or fibers.

In the second step of the process of this invention, the shaped article of the intimate mixture obtained in the first step is extracted to remove the aromatic hydroxy compound.

The extraction is advantageously carried out by using a solvent which dissolves the aromatic hydroxy compound but does not dissolve the polyamide.

Preferably, the solvent is selected, for example, from water, aqueous solutions of basic compounds (e.g., sodium hydroxide), aliphatic alcohols having 1 to 6 carbon atoms, ethylene glycol, tetrahydrofuran, dioxane, anisole, acetone, methyl ethyl ketone, methyl acetate, ethyl acetate, benzene, toluene, xylene, methylene chloride, chloroform and trichloroethylene.

Extraction with the extracting solvent is carried out advantageously at a temperature higher than 0° C. but lower than the boiling point of the solvent. The extraction time differs depending upon the form of the shaped article, the type of the extraction solvent, the extracting temperature, etc. It is not so difficult however to determine a suitable extraction time.

According to this invention, at least 90% by weight, preferably at least 95% by weight, of the aromatic hydroxy compound can be removed from the shaped article. Hence, the process of this invention can give a shaped polyamide article which is little affected by the aromatic hydroxy compound.

Where the shaped article is a polyamide filament, the present invention provides, as one embodiment of the invention, a process for producing polyamide fibers, which comprises (1)' melt-spinning an intimate mixture of 100 parts of a polyamide containing hexamethylene terephthalamide as main recurring units and 20 to 500 parts by weight of an aromatic hydroxy compound, and (2)' removing the aromatic hydroxy compound by extraction from the undrawn filaments after optionally drawing it, and thereafter, optionally drawing the filaments.

Melt-spinning in step (1)′ may be carried out by known melt-spinning techniques for nylon-66, nylon-6, etc. Specifically, the intimate mixture is melted in an extruder or the like, and the resulting melt is extruded from spinning nozzles and then taken up. The undrawn filaments obtained may be wound up, or be fed successively to the next step (2)′. The process of this invention enables polyamides, particularly nylon-6T, which cannot be melt-spun in the prior art because of their high melting points, to be fiberized by ordinary melt-spinning by the plasticizing action of the aromatic hydroxy compound. The advantage of the process of this invention is therefore very great.

In step (1)′, a draft ratio of, for example, 20 to 400 is used.

In step (2)′, the aromatic hydroxy compound is removed by extraction from the undrawn filaments of the intimate mixture. There is employed a method which comprises drawing the undrawn filaments and then removing the aromatic hydroxy compound from it by extraction, or a method which comprises further drawing the undrawn filaments or drawn filaments from which the aromatic hydroxy compound has been removed by extraction.

Drawing is carried out at a draw ratio of at least 1.5, preferably at least 1.75, especially preferably at least 2. The optimal drawing temperature differs depending upon the composition of the polyamide, the type and amount of the aromatic hydroxy compound etc. It is preferably about 40° C. to (the melting point of the intimate mixture—30)°C., especially preferably 50° C. to (the melting point of the intimate mixture—50)°C.

Removal of the aromatic hydroxy compound by extraction in step (2)′ may be carried out by immersing filaments to be extracted (undrawn or drawn filaments) in a solvent which dissolves the aromatic hydroxy compound but does not dissolve or swell the polyamide. The extracting solvent may be the same as those exemplifed hereinabove. The extracting temperature and time are selected such that preferably at least 90% by weight, especially preferably at least 95% by weight, of the aromatic hydroxy compound is extracted from the mixture. Such an extracting temperature and time differ depending upon the type and amount of the aromatic hydroxy compound, the denier size of the drawn yarns, etc. Preferably, the extraction time is 1 second to 20 minutes at a temperature of 10° C. to the boiling point of the solvent, and especially preferably, about 2 seconds to 10 minutes at 20° C. to (the boiling point of the solvent—10)°C. at the time of extraction, the filaments to be extracted may be held at constant length, under restricted shrinkage, or under tension. In view of improving the properties of the resulting filaments, they are preferably maintained at constant length or under tension. This extracting treatment results in removal of the aromatic hydroxy compound and gives filaments composed substantially of the polyamide.

According to the process of this invention, spinning can be performed by a conventional melt-spinning method, and finally, fibers having the inherent heat resistance of the polyamide, for example, fibers of nylon-6T having a melting point of 370° C., can be obtained industrially advantageously.

The polyamide fibers obtained by the above process may subsequently be drawn and/or heat-treated to give fibers having further improved mechanical properties. The polyamide fibers obtained by the process of this invention, particularly nylon-6T fibers, have very superior mechanical properties, heat resistance and chemical resistance. The process of this invention has a very great industrial significance since conventional manufacturing steps such as melt-spinning and drawing can be applied directly to it.

When the shaped article is a polyamide film, the present invention provides, as one embodiment of the invention, a process for producing a polyamide film, which comprises (1)″ melt-extruding an intimate mixture of 100 parts by weight of a polyamide containing hexamethyleneterephthalamide as main recurring units and 20 to 500 parts by weight of an aromatic hydroxy compound to form a film, and thereafter, (2)″ removing the aromatic hydroxy compound by extraction from the resulting unstretched film after optionally stretching it, and then optionally stretching the film.

Melt-extrusion in step (1)″ may be carried out by an ordinary method of forming a molten film which is used to form a film from a thermoplastic resin such as polyethylene terephthalate. Specifically, it is carried out by melting the mixture in an extruder or the like, extruding the molten mixture from a die slit, and taking up the extrudate. The resulting unstretched film may be wound up, or may be successively fed to the next step (2)″ without wind-up.

In step (2)″, the aromatic hydroxy compound is removed by extraction from the resulting unstretched film of the intimate mixture. There may be employed a method which comprises stretching the undrawn film and then removing the aromatic hydroxy compound from it by extraction, or a method which comprises further stretching the unstretched film or stretched film from which the aromatic hydroxy compound has been removed by extraction.

Stretching may be carried out monoaxially in the machine direction. Alternatively, the unstretched film may be biaxially stretched in the machine direction and in a direction at right angles to it either simultaneously or consecutively. In the monoaxial stretching, the stretch ratio is preferably at least 1.5 times. In the biaxial stretching, the stretch ratio is preferably such that the area ratio becomes at least 2 times. The preferred stretching temperature is the same as that described hereinabove with regard to the embodiment of producing fibers.

The extraction of the aromatic hydroxy compound in tep (2)″ is carried out, for example, for 1 second to 30 minutes at 10° C. to the boiling point of the solvent, preferably for 2 seconds to 15 minutes at 20° C. to a temperature 10° C. lower than the boiling point of the solvent. The extraction may be carried out while maintaining the film at constant length or under tension.

By this extraction, at least 90% by weight, preferably at least 95% by weight, of the aromatic hydroxy compound can be removed, and for example, a film composed substantially of the polyamide may be obtained.

The film obtained by the above method may subsequently be stretched and/or heat-treated to give a film having much higher mechanical properties. The resulting film has excellent mechanical properties, heat resistance and chemical resistance.

The following Examples illustrate the present invention more specifically.

All parts in these examples are by weight. The inherent viscosity, $\xi_{inh}$ is a value measured at 30° C. in concentrated sulfuric acid in a concentration of 0.5 g/dl.

The melting point is a value measured by DSC at a temperature elevation rate of 10° C./min.

EXAMPLE 1

A reactor equipped with a stirring device and a distillation system was charged with 15.9 parts of diphenyl terephthalate, 5.8 parts of hexamethylenediamine and 28 parts of p-chlorophenol (pKa=9.14, M/n=128.5), and then purged with nitrogen. The reactor was immersed in a salt bath at 240° C., and heated under atmospheric pressure. In about 5 minutes, a uniform transparent melt was obtained as a reaction product. When it was further stirred and reacted for 10 minutes, its viscosity gradually increased and a uniform melt having spinnability was obtained. The resulting composition was cooled, solidified and pulverized to form chips. The chips were treated in acetone under reflux to extract p-chlorophenol from it, and then dried at 150° C.

The resulting polyamide had an $\xi_{inh}$ of 1.25, and a DSC melting point of 371° C.

EXAMPLES 2-4

In each run, 15.9 parts of diphenyl terephthalate, 5.8 parts of hexamethylenediamine, 20 parts of p-chlorophenol and bis(4-hydroxyphenyl)sulfone (pKa=8.97, M/n=1.25) in each of the amounts indicated in Table 1 were charged into a reactor equipped with a stirring device and a distillation system, and heated to 240° C. under atmospheric pressure in a stream of nitrogen. In about 5 minutes, a uniform transparent melt was obtained as a reaction product. The reaction temperature was then elevated to each of the final temperatures indicated in Table 1 over the course of about 30 minutes to distill off p-chlorophenol. Furthermore, the pressure was adjusted to 20 mmHg over the course of about 5 minutes at the above temperature, and the reaction product was maintained under these conditions for 5 minutes to distill off the remaining p-chlorophenol completely. The resulting product was a uniform transparent melt having spinnability. The melting point (KDSC) of the resulting composition and the $\xi_{inh}$ and melting point of the polyamide measured after extracting bis(4-hydroxyphenyl)sulfone from the composition by treatment with acetone under reflux are shown in Table 1.

TABLE 1

| Example | Amount of bis(4-hydroxyphenyl)-sulfone (parts) | Final temperature (°C.) | Melting point of the composition (°C.) | Polyamide $\xi_{inh}$ | Polyamide Melting point (°C.) |
| --- | --- | --- | --- | --- | --- |
| 2 | 12.3 | 315 | 310 | 1.52 | 370 |
| 3 | 15.0 | 305 | 300 | 1.55 | 370 |
| 4 | 18.5 | 295 | 288 | 1.45 | 371 |

EXAMPLE 5

Diphenyl terephthalate (15.9 parts), 5.8 parts of hexamethylenediamine, 18.5 parts of 2,2-bis(4-hydroxyphenyl)hexafluoropropane (M/n=168) and 20 parts of p-chlorophenol were charged into the same reactor as used in Example 2, and heated to 240° C. under atmospheric pressure in a stream of nitrogen. In about 5 minutes, a uniform transparent solution resulted. It was heated to 300° C. over the course of about 30 minutes. The resulting reaction product was a uniform melt having spinnability. The polyamide obtained by extracting it with acetone under reflux had an $\xi_{inh}$ of 1.41 and a melting point of 370° C.

EXAMPLE 6

A salt of terephthalic acid and hexamethylenediamine (nylon-6T salt; 14.1 parts), 15 parts of bis(4-hydroxyphenyl)sulfone and 0.016 part of tripheynl phosphite were introduced into the same reactor as used in Example 1, and heated to 250° C. under atmospheric pressure in a stream of nitrogen. In about 10 minutes, a uniform solution resulted as a reaction product, and water began to distill off. The reaction temperature was then elevated to 300° C. over the course of about 40 minutes, and the solution was maintained at this temperature for 10 minutes. The resulting product was uniform and transparent. The polyamide obtained by extracting bis(4-hydroxyphenyl)sulfone from it had an $\xi_{inh}$ of 0.65 and a melting point of 370° C.

EXAMPLES 7-9

(2) Production of nylon-6T composition

Diphenyl terephthalate (127.2 parts), 46.2 parts of hexamethylenediamine, 125.2 parts of bis(4-hydroxyphenyl)sulfone and 120 parts of p-chlorophenol were introduced into a reactor equipped with a stirring device and a distillation system, and heated to 250° C. under atmospheric pressure in a stream of nitrogen. In about 5 minutes, a uniform transparent melt was obtained as a reaction product. The reaction temperature was then elevated to 300° C. over the course of about 30 minutes to distill off p-chlorophenol. The reaction product was further maintained under a weak vacuum of 20 mmHg and at the above temperature for about 10 minutes, and then under a high vacuum of 0.5 mmHg for about 5 minutes to distill off p-chlorophenol completely.

The melt obtained was transparent and uniform. The resulting composition composed of nylon-6T and bis(4-hydroxyphenyl)sulfone had a melting point of 294° C. Nylon-6T had an $\xi_{inh}$ of 2.10.

(2) Spinning of nylon-6T composition

Chips of the above nylon-6T composition were dried under vacuum at 150° C. for 80 hours, and melt-extruded at a polymer temperature of 300° C. by using a single-screw extruder having a screw diameter of 22 mm through a spinning cap equipped with a nozzle having 12 holes each with a length of 0.8 mm and a diameter of 0.4 mm at a rate of about 20 g/min. The extruded composition was transparent and uniformly molten. It was wound up at a spinning speed of 500 m/min. to obtain pale yellow transparent filaments having an $\xi_{inh}$ of 1.78.

(3) The filaments obtained above were drawn at a draw ratio of 4 on a hot plate kept at 100° C., and then immersed in each of the solvents indicated in Table 2 under the conditions indicated in Table 2 while they were maintained at constant length. Thus, bis(4-hydroxyphenyl)sulfone was extracted.

The amount of bis(4-hydroxyphenyl)sulfone extracted based on the initially included bis(4-hydroxyphenyl)sulfone is shown in Table 2. It is seen that bis(4-hydroxyphenyl)sulfone was extracted almost quantitatively within a very short period of time.

TABLE 2

| Example | Solvent | Extracting conditions Temperature (°C.) | Time (sec.) | Amount of extraction (wt. %) |
|---|---|---|---|---|
| 7 | Acetone | 20 | 20 | 99.6 |
| 8 | Methanol | 30 | 10 | 99.8 |
| 9 | 1N aqueous NaOH solution | 50 | 15 | 99.2 |

EXAMPLE 10

The nylon-6T filaments obtained in Example 7 were heat-treated under tension at a ratio of about 1.1 on a hot plate kept at 270° C. The heat-treated filaments had a tenacity of 5.8 g/de, an elongation of 12% and a Young's modulus of 96 g/de and were very tough. They had a melting point of 370° C. When they were left to stand on a hot plate kept at 300° C., they were no longer melted, and showed excellent heat resistance.

EXAMPLE 11

(1) Diphenyl terephthalate (22.3 parts), 8.9 parts of diphenyl adipate, 11.6 parts of hexamethylenediamine, 30 parts of bis(4-hydroxyphenyl)sulfone and 15 parts of p-chlorophenol were introduced into a reactor equipped with a stirring device and a distillation system, and heated to 240° C. under atmospheric pressure in a stream of nitrogen. In about 5 minutes, a uniform transparent melt was obtained as a reaction product. The reaction temperature was then elevated to 270° C. and the reaction product was maintained at this temperature. Then, over the course of about 5 minutes, the pressure was reduced to 20 mmHg. Furthermore, the product was treated for 2 minutes under a high vacuum of 0.5 mmHg to distill off phenol and p-chlorophenol out of the reaction system. The resulting product was transparent and uniform. It was treated with acetone under reflux to extract bis(4-hydroxyphenyl)sulfone. The residue had an $\xi_{inh}$ of 2.63.

(2) The resulting composition was extruded at 280° C. from a nozzle having a diameter of 0.5 mm and a length of 1.0 mm to form an undrawn filament. The undrawn filament was drawn to 5.0 times at 50° C., and at constant length, immersed in acetone at room temperature for 3 minutes to extract bis(4-hydroxyphenyl)sulfone. The filament was dried at 100° C. for 5 minutes. The filament was further heat-treated at 300° C. under tension to give a transparent filament having a tenacity of 5.1 g/de, an elongation of 24% and a Young's modulus of 56 g/de. This filament had a melting point of 332° C.

EXAMPLE 12

Diphenyl terephthalate (318 parts), 116.2 parts of hexamethylenediamine, 313 parts of bis(4-hydroxyphenyl)sulfone and 400 parts of phenol were introduced into a pressure reactor equipped with a stirring device and a distillation system. After purging with nitrogen, the pressure was adjusted to a nitrogen pressure of 1.0 kg/cm$^2$, and the temperature was elevated from 220° C. to 285° C. over the course of about 90 minutes to react the above materials. The pressure of the inside of the reaction system was then returned to atmospheric pressure in about 5 minutes to give a nylon-6T composition. After removing bis(4-hydroxyphenyl)sulfone by extraction with refluxing acetone, it had an $\xi_{inh}$ of 2.34.

The resulting nylon-6T composition was dried under vacuum at 120° C. for 30 hours and spun at a polymer temperature of 294° C. through a nozzle having 6 holes each having a diameter of 0.4 mm and a length of 0.8 mm in an extruder-type spinning machine at a spinning speed of 500 m/min. The resulting undrawn filaments were drawn to 3.0 times at 60° C., and further drawn to 1.1 times in acetone at room temperature (immersed in acetone for 2 minutes). Then, the filaments were dried at constant length for 5 minutes at 100° C. The filaments were further heat-treated at 300° C. under tension (20% stretch) to form filaments having a tenacity of 7.0 g/de, an elongation of 8%, a Young's modulus of 98 g/de, and a melting point of 370° C.

EXAMPLES 13-15

In each run, the undrawn filaments obtained in Example 12 [containing bis(4-hydroxyphenylsulfone)] were immersed in each of the solvents indicated in Table 3 to extract the bis(4-hydroxyphenyl)sulfone, and then dried at 100° C. for 10 minutes. The resulting filaments were further heat-treated at 320° C. under tension (10 to 20% stretch) to give filaments having the properties shown in Table 3

TABLE 3

| Example | Extracting solvent | Extracting conditions Temperature (°C.) | Time (min.) | Properties of the filaments Tenacity (g/de) | Elongation (%) | Young's modulus (g/de) |
|---|---|---|---|---|---|---|
| 13 | methyl ethyl ketone | room temp. | 1 | 6.5 | 10 | 82 |
| 14 | methanol | room temp. | 5 | 4.4 | 17 | 65 |
| 15 | tetrahydrofuran | room temp. | 3 | 5.9 | 12 | 70 |

EXAMPLE 16

The nylon-6T polymer composition obtained in Example 12 was dried as in Example 12, and melt-extruded from a T die having a width of 150 mm and a slit of 0.5 mm in an extruder at a polymer temperature of 295° C. with an average residence time of 3 minutes to form a transparent unstretched film having a thickness of about 150 microns. The film was monoaxially stretched to 4.5 times at 90° C., immersed at constant length in acetone under reflux for 10 minutes to extract bis(4-hydroxyphenyl)sulfone, and subsequently dried at 100° C. for 15 minutes. The resulting film had a strength of 9.8 kg/mm$^2$, an elongation of 38% and a Young's modulus of 220 kg/mm$^2$ in the stretching direction.

EXAMPLE 17

Nylon-6T salt (28.2 parts), 25 parts of bis(4-hydroxyphenyl)sulfone, 20 parts of p-chlorophenol and 0.01 part of phosphoric acid were introduced into a reactor equipped with a stirring device and a distillation system, and after purging with nitrogen, reacted at 260° C. under atmospheric pressure for 30 minutes, under a weak vacuum of about 10 mmHg for 15 minutes, and then under a high vacuum of 0.4 mmHg for 20 minutes. The reaction mixture was cooled, pulverized, and put in the same reactor as above. After purging with nitrogen, it was heated from 200° C. to 250° C. under a high vacuum of 0.3 mmHg over the course of about 2 hours. At 250° C., the above pulverized chips remained solid without melting or melt-adhesion. They were further subjected to solid-phase polymerization under the above conditions for 12 hours, and then spun from a nozzle having a diameter of 0.4 mm and a length of 0.8 mm in an extruder-type spinning machine at a temperature of 300° C. with an average residence time of about 2 minutes. The filament was drawn to 3 times at 70° C., and then immersed at constant length in acetone for 2 minutes and dried at 100° C. for 3 minutes. When the filament was further heat-treated at 300° C. under tension, a filament having a tenacity of 4.3 g/de, an elongation of 29% and a Young's modulus of 65 g/de was obtained.

EXAMPLE 18

Nylon-6T ($\xi_{inh}$ 0.95, mp. 370° C.) was synthesized from terephthaloyl chloride and hexamethylenediamine by the interfacial polycondensation method described in J. Polym. Sci., 40, 343 (1958). One hundred parts of the resulting polymer was pulverized to a size of not more than 0.5 mm, and mixed with 125 parts of a powder of bis(4-hydroxyphenyl)sulfone by a V-type blender. The mixture was dried in vacuum at 180° C. for 24 hours and then melt-extruded from a nozzle having a diameter of 0.5 mm and a length of 1 mm in a twin-screw extruder at a polymer temperature of 300° C. with an average residence time of about 2 minutes. The resulting filament was drawn to 3.5 times at 60° C., immersed at constant length in acetone at room temperature for 2 minutes, dried at 100° C. for 45 minutes, and further heat-treated at 300° C. under tension. The resulting filament had a tenacity of 3.9 g/de, an elongation of 30%, and a Young's modulus of 66 g/de.

What is claimed is:

1. A process for producing a shaped article of polyamide which comprises
   (1) melt-shaping an intimate mixture of 100 parts by weight of a polyamide having hexamethylene terephthalamide as main recurring units and 20 to 500 parts by weight of an aromatic hydroxy compound, said aromatic hydroxy compound having a phenolic hydroxyl group and at least one electron attracting group selected from the group consisting of halogen atoms, a nitro group, halogenoalkyl groups, a carbonyl group and a sulfone group on a phenyl ring to which said hydroxyl group is bonded, and then
   (2) removing the aromatic hydroxy compound from the resulting shaped article by extraction.

2. The process of claim 1 wherein the polyamide is a polyamide comprising at least 70 mole%, based on the entire recurring units of said polyamide, of hexamethylene terephthalamide recurring units.

3. The process of claim 1 wherein the polyamide is a polyamide comprising at least 80 mole %, based on the entire recurring units of said polyamide, of hexamethylene terephthalamide recurring units.

4. The process of claim 1 wherein the polyamide has a melting point of about 320° C. to about 370° C.

5. The process of claim 1 wherein the polaymide has an inherent viscosity $\xi_{inh}$, measured at 30° C. in concentrated sulfuric acid in a concentration of 0.5 g/dl, of at least 0.4.

6. The process of claim 5 wherein the inherent viscosity of the polyamide is in the range of 1 to 3.

7. The process of claim 1 wherein a pKa value of the aromatic hydroxy compound is smaller than the pKa value of phenol which is 10.

8. The process of claim 1 wherein the aromatic hydroxy compound satisfies the following relation $M/n \leqq 200$ wherein M is the molecular weight of the aromatic hydroxy compound, and n is the number of hydroxyl groups in the aromatic hydroxy compound.

9. The process of claim 1 wherein the aromatic hydroxy compound gives a melting point, which differs from the melting points of the polyamide and the aromatic hydroxy compound, to said intimate mixture.

10. The process of claim 1 wherein the aromatic hydroxy compound has a boiling point higher than a temperature used in the melt-shaping.

11. The process of claim 1 wherein said intimate mixture is composed of 100 parts by weight of the polyamide and 40 to 300 parts by weight of the aromatic hydroxy compound.

12. The process of claim 1 wherein said intimate mixture has a melting point of 220° to 330° C.

13. The process of claim 1 wherein the melt-shaping is carried out at a temperature 2° C. higher than the melting point of said intimate mixture to 30° C. higher than said melting point.

14. The process of claim 1 wherein the aromatic hydroxy compound is removed from the shaped article obtained in step (1) by extraction with a solvent which dissolves the aromatic hydroxy compound but does not dissolve the polyamide.

15. The process of claim 14 wherein the solvent is selected from the group consisting of water, aqueous solutions of basic compounds, aliphatic alcohols having 1 to 6 carbon atoms, ethylene glycol, tetrahydrofuran, dioxane, anisole, acetone, methyl ethyl ketone, methyl acetate, ethyl acetate, benzene, toluene, xylene, methylene chloride, chloroform, and trichloroethylene.

16. The process of claim 1 wherein the aromatic hydroxy compound is extracted from the shaped article obtained in step (1), with a solvent at a temperature higher than 0° C. but lower than the boiling point of the solvent.

17. The process of claim 1 wherein the shaped article obtained in step (1) is a film or fiber.

18. A process for producing polyamide fibers, which comprises:
   (1)' melt-spinning an intimate mixture of 100 parts of a polyamide containing hexamethylene terephthalamide as main recurring units and 20 to 500 parts by weight of an aromatic hydroxy compound, said aromatic hydroxy compound having a phenolic hydroxyl group and at least one electron attracting group selected from the group consisting of halogen atoms, a nitro group, halogenoalkyl groups, a carbonyl group and a sulfone group on a phenyl ring to which said hydroxyl group is bonded, and
   (2)' removing the aromatic hydroxy compound by extraction from the resulting undrawn filaments before or after drawing it, and thereafter, drawing the filaments.

19. A process for producing a polyamide film which comprises
   (1)'' melt-extruding an intimate mixture of 100 parts by weight of a polyamide containing hexamethylene terephthalamide as main recurring units and 20 to 500 parts by weight of an aromatic hydroxy compound to form a film, said aromatic hydroxy compound having a phenolic hydroxyl group and at least one electron attracting group selected from the group consisting of halogen atoms, a nitro group, halogenoalkyl groups, a carbonyl group and a sulfone group on a phenyl ring to which said hydroxyl group is bonded, and thereafter, (2)" removing the aromatic hydroxy compound by extraction from the resulting unstretched film before or after stretching it, and thereafter stretching the film.

* * * * *